United States Patent [19]

Whalen et al.

[11] Patent Number: 5,797,135

[45] Date of Patent: Aug. 18, 1998

[54] SOFTWARE STRUCTURE FOR DATA DELIVERY ON MULTIPLE ENGINES

[75] Inventors: Dennis Whalen, New Brighton; Jeffrey A. Pepper, Verona; Rajiv Enand, Gibsonia, all of Pa.

[73] Assignee: ServiceWare, Inc., Oakmont, Pa.

[21] Appl. No.: 640,531

[22] Filed: May 1, 1996

[51] Int. Cl.⁶ .................................................. G06F 15/18
[52] U.S. Cl. ........................ 706/53; 706/54; 706/45; 706/46
[58] Field of Search ................................. 395/62, 50, 51

[56] References Cited

U.S. PATENT DOCUMENTS

| | | | |
|---|---|---|---|
| 4,763,277 | 8/1988 | Ashford et al. | 395/62 |
| 5,018,075 | 5/1991 | Ryan et al. | 395/50 |
| 5,295,230 | 3/1994 | Kung | 395/75 |
| 5,594,638 | 1/1997 | Lliff | 395/64 |
| 5,644,686 | 7/1997 | Hekmatpour | 395/62 |
| 5,699,402 | 12/1997 | Bauer et al. | |

OTHER PUBLICATIONS

N. Nishiuchi, "Concurrent Object–Oriented Diagnostic System," Proc. Int'l Workshop on Artificial Intelligence for Industrial Applications, pp. 591–596, May 1988.

J.D. Riedesel, "An Object Oriented Model for Expert System Shell Design," Ninth Annual Int'l Pheonix Conf. on Computers and Communications, pp. 699–705, Mar. 1990.

Primary Examiner—Robert W. Downs
Attorney, Agent, or Firm—Morgan, Lewis & Bockius LLP; C. Scott Talbot

[57] ABSTRACT

An object-oriented decision structure usable by different diagnostic software engines defines a knowledge base that includes a problem, a symptom of the problem, a solution, and case in which the solution is the solution to the problem. The data structure includes a question object defining a question, a response object defining an answer, a question node object, a solution node object defining the case, a case master object defining the problem, the solution, and the case, and a symptom object defining the symptom and pointing to the case master object and to the solution node object. The question node object points to the solution node object, the question object, and the response object and correlates the question, the response, and the solution node object, and the solution node object points to the case master object. The data structure is thus capable of use by a case based reasoning system software engine to establish the existence of the case, and thus that the solution is the solution to the problem, by identifying the symptom, matching the symptom to the symptom object, following the symptom object to the solution object, and following the solution object to the case master object. The data structure is also capable of use by a tree-based expert system software engine to establish the existence of the case by selecting the question node object, following the question node object to the question object to pose the question, matching a received answer to the response object, following the question node correlation of the question, the answer, and the solution node object to the solution node object, and following the solution node object to the case master object.

3 Claims, 2 Drawing Sheets

SOFTWARE STRUCTURE FOR DATA DELIVERY ON MULTIPLE ENGINES

FIELD OF THE INVENTION

The present invention provides a computer executable decision structure stored on a computer-readable storage medium for delivering solution information to various types of software engines used in resolving diagnostic problems encountered during application software operation.

BACKGROUND OF THE INVENTION

The present invention provides a computer-executable decision structure stored on a computer-readable storage medium which can be used with various types of software programs, known as software diagnostics engines, that resolve diagnostics problems encountered in the running of application software. Typical software diagnostics engines include expert systems, decision trees, case based reasoning, hypermedia browsers, full text search engines and like software. Typically, delivery of the information required to solve diagnostics problems in a particular type of application software is limited to an engine that is specifically designed to search the database containing that information.

Accordingly, the object of the present invention is to provide a computer-executable decision structure stored on a computer-readable storage medium which allows the same diagnostic solution information to be utilized by different types of software diagnostics engines. It is a further object of the invention to provide a computer-executable decision structure stored on a computer-readable storage medium that permits delivery of diagnostic solution knowledge to software diagnostic problem resolution software.

SUMMARY OF THE INVENTION

Generally, the present invention provides a computer-executable object oriented decision structure stored on a computer-readable storage medium that can interface with various types of software diagnostics engines. The decision structure of the present invention permits a universal set of data known as the diagnostics knowledge base to be imported by different types of software diagnostics engines to locate and display the appropriate information for resolving the particular software diagnostics problem being queried.

The invention provides a first level object that encompasses all the other objects and provides global information concerning the data contained in the diagnostics knowledge base. This first level object is entitled the "Title" object herein.

Preferably nested within the Title object is a plurality of lower-level objects. Many of the lower-level objects can be linked to (i.e., can "point" to) other lower-level objects to allow an importer that may be used with the software diagnostics engine to step through the decision structure to select a desired path for locating the resolution to a particular software diagnostics problem. The path can be chosen by utilizing decision trees, case bases and the like.

The objects which contain pointers to other objects are known as node objects while the objects which are pointed to by the node objects are other lower-level nested objects that may include question objects, response objects, case master objects and other node objects. Symptom objects which point to node objects and case master objects can be used when the symptoms of a diagnostics problem can be described by the user.

Question objects define all the questions in the knowledge base that are used to identify and localize the solution to a software diagnostics problem. Response objects define the answers to the question objects. Case master objects contain the solutions to the diagnostics problems that have been characterized and localized by the question and response objects. Each case master object defines a diagnostics problem solution pair. Case detail objects describe how to confirm a case. Symptom objects which point to node objects and case master objects can be used when only the symptoms of a diagnostics problem can be described by the user. The symptom objects are matched with the symptoms of a diagnostics problem as reported by the user to allow the user to enter the decision structure before defining a particular diagnostics problem in terms of a question for resolution.

Additionally, the objects contain data fields identified by tags. Field values can consist of a single element of one data type or a list of multiple elements of that data type separated by a notation such as a comma. Data types that are supported by the decision structure of the present invention include simple ASCII strings and strings which include one or more embedded hyperlinks. Time, date and real numbers are also supported. A unique identifier is provided as a pointer for each object to allow linking that object to other objects.

The present invention provides a decision structure that can be loaded and run by presently available commercial software diagnostics engines to deliver application software diagnostics solution knowledge from a universal knowledge base. Other advantages will become apparent from a perusal of the following detailed description of a presently preferred embodiment taken in connection with the accompanying drawings.

PRESENTLY PREFERRED EMBODIMENT

Figure 1:
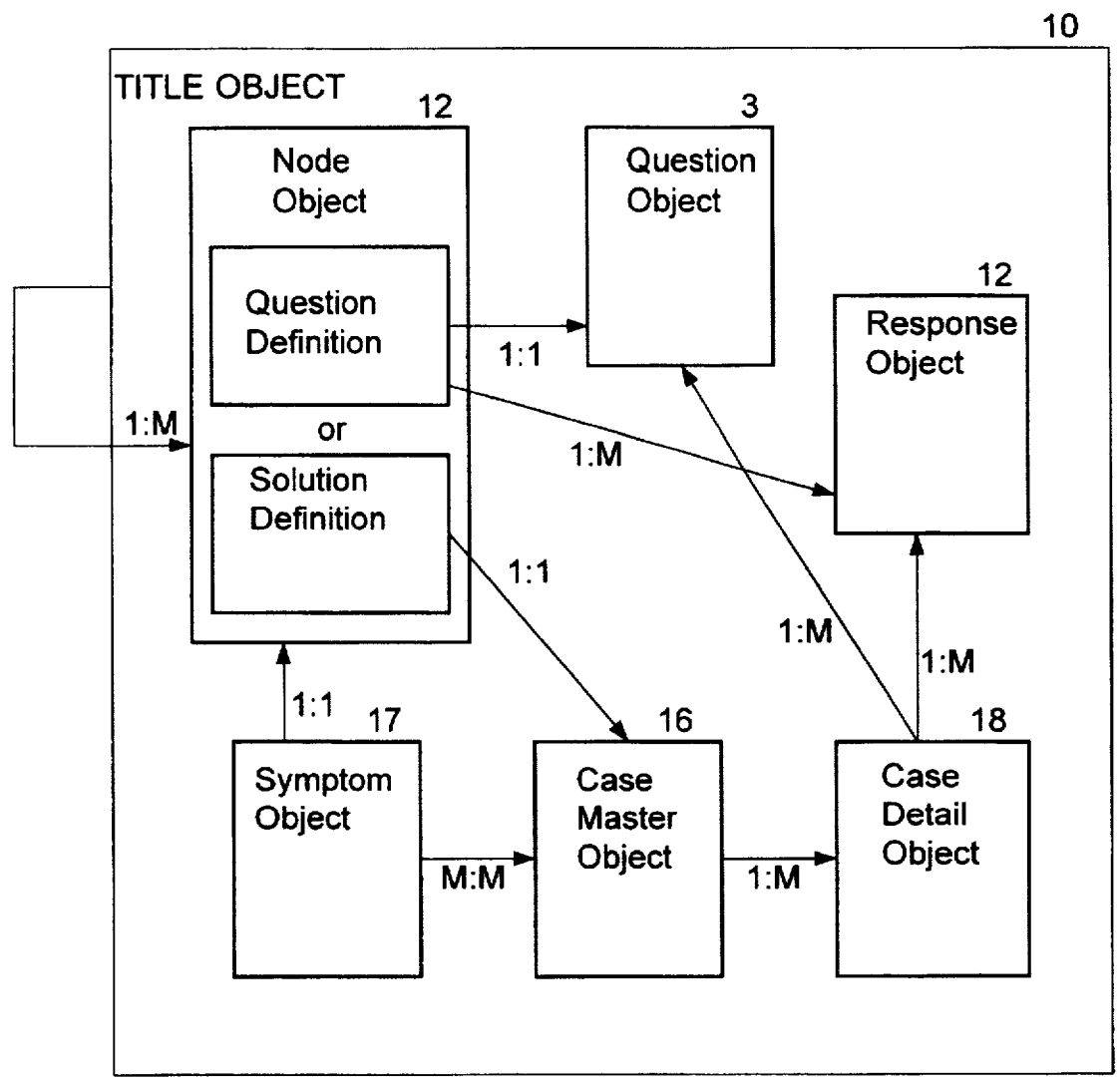
FIG. 1 is a diagrammatic illustration showing the relationship between objects of the present invention.

Referring to FIG. 1, the present invention uses the object-oriented computer programming concept to provide a computer-executable decision structure stored on a computer-readable storage medium that permits utilization of a universal set of application software diagnostics solution information by different software diagnostics engines. The decision structure comprises a number of related diagnostics objects. Appendix A provides a representative sample of the content of the various types of objects comprising the decision structure. Each individual object is defined by a unique set of software diagnostics problem attributes that are used to characterize, identify and locate the particular information needed to resolve the diagnostics problem being queried. The unique grouping of attributes contained in each object allows that object to be linked to other objects that will further localize the problem and its solution. At each object level, the importer selects from among the group of attributes contained in that object for further inquiry as to the cause of the diagnostics problem. As the importer steps through the decision structure by linking objects in this manner, the inquiry becomes increasingly specific to allow the particular diagnostics problem being experienced and its solution to be located within the universal knowledge base.

FIG. 1 shows the object types and the linking relationships between the objects of any two individual object types.

These linking relationships are labeled either as a 1—1 or one-to-one relationship, a 1:M or one to many relationship, and an M:M or many-to-many relationship. A one-to-one relationship between objects means that the particular combination of attributes contained in a single object of the selected object type can be linked by the importer to only the attributes contained in a single object of the related object type. Conversely a one-to-multiple relationship means that the particular combination of attributes contained in a single object of the selected object type can be linked to the attributes contained in many possible objects of the related object type. Finally a multiple-to-multiple relationship means that many possible individual combinations of attributes contained in different objects of the selected object type can be linked to many possible individual combinations of attributes from different objects of the related object type.

As shown in FIG. 1, all of the objects in the decision structure are encompassed by (or nested within) the first level object, known as the Title object 10. Title object 10 is the top-level object in the present invention structure and provides global information concerning the data contained in the universal knowledge base. Various types of information might be included with the Title object 10 such as release date, copyright, and the like. Most importantly, however, Title object 10 is identified as the root node object and is the only object that does not have a node object pointing to it.

A node object 12 is an object from which a lower-level nested object has been linked as the importer steps through the decision structure. In other words, the importer first encounters a node object 12 and selects from the attributes contained in that object to link to a lower-level nested object or objects, including question objects 3, response objects 12, case master objects 16 and case detail objects 18. In this way, the importer steps through the decision structure to further localize the particular diagnostic problem by proceeding from one node object to a lower-level nested object to another node object to another lower-level nested object and so forth until the solution information for the particular diagnostics problem being experienced is located within the universal knowledge base.

As shown in FIG. 1, a plurality of pointer node objects 12 preferably implements the decision structure of the present invention and can be used by the importer to traverse the decision structure in tree-like fashion. As shown in Appendix A, each node object 12 contains a set of initial data fields, followed by either a question definition or a solution definition. The data fields are identified by tags. In the preferred embodiment the tags are identified by "<>" symbol which will be used herein and are followed by a string value in quotes "", or a numeric value. Field values can consist of a single element of one data type or a list of multiple elements of that data type separated by a notation such as a comma. Data types that are supported by the decision structure of the present invention include simple ASCII strings and strings which include one or more embedded hyperlinks. Time, date and real numbers are also supported.

As shown in Appendix A, if a node object 12 is a question it contains an identifier or "pointer" to link that node object 12 to a question object 3. Preferably, these identifiers include a letter symbolically associated with the object type such as "Q" for a question object 3, "S" for a symptom object 17 and the like. Preferably, an eight digit number provides the unique identifier for each specific object of a given object type. These entities are separated by a colon. For example, S:12345678 might identify a specific symptom object 17.

The node object 12 also contains a value for the weight of the question in reasoning about the diagnosis and a list of possible responses to the question. The weight field is a real number between 0 (showing no relevance to the diagnosis) and 1 indicating that the question is vital to the diagnosis. On the other hand, if the node object 12 is a solution then it contains a pointer linking it to the case master object 16 containing that solution, the solution type of which is one of the following: "suggestion" , "problem solution" , "error solution" and "how to solution" .

The first node object 12 in a decision tree is always a question and its pointer is given in the root node I.D. field of the title object 10. From there one can follow the pointers contained in the "CHILDREN" field of each successive node object 12 encountered in the decision structure to build a complete decision tree. Back pointers to preceding node objects are given in the "PARENT" field of the current node object, if the importer has a need to traverse the tree from the bottom up. Node objects 12 always have preceding (or parent) node objects, except for the root node. Node objects which are questions always have successor (or children) objects, but node objects which are solutions do not have children objects.

Question objects 3 define all questions in the decision structure that are used by the importer to locate solution data in the universal knowledge base. Questions contained in the question objects 3 always have answers, called responses, which are defined in response objects 14. Question objects 3 are pointed to by node objects 12 in tree-based expert systems and by case detail objects 18 in case based reasoning systems.

It is possible that questions may be sometimes preceded by actions which are sets of instructions to be followed by the importer before reading and answering the questions. Normally, actions are displayed first, followed by a blank line, then the question, then all possible responses.

Response objects 14 provide answers to the questions contained in the question objects 3. There may be any number of responses to any question, but in the preferred mode questions always must have at least two responses. Response objects 14 include a data string containing the full text of the response, as well as a data string containing a short response. The short response is an abbreviated version of the full text response to be used by software diagnostics engines that are limited in their display base and cannot display the full response text. The response objects 14 are not pointed to directly from question objects 3, but are pointed to by node objects 12 and by case detail objects 18. This permits the use of different sets of responses to the same question under different circumstances.

Case master objects 16 contain all the information about an actual problem and a solution to that problem. Thus each case master object 16 describes a problem solution pair. There may be more than one actual problem for a given solution, and there may be more than one solution for a given actual problem. There may be even more than one case master object 16 for the same problem solution pair, such as when there are two different paths that can be followed through a decision tree to get from a given problem to a given solution. It is possible to combine fields to display a complete solution using a case master object 16.

Symptom objects 17 contain symptoms that are strings describing how the user perceives a problem. Symptom objects 17 are not pointed to by other objects as they exist only for those software products that want to compare a user's described problem with symptoms in the universal knowledge base. Symptom objects 17 point to node objects 12 so that the focus of the diagnosis can be moved to the appropriate node object 12 in the decision structure for continued diagnosis after a match is made between the symptom text input by the user and the symptom object 17. Symptom objects 17 also point to case master objects 16 so that symptoms can be a starting point for assembling cases. In the present invention, symptoms are described as perceived problems to differentiate them from actual problems contained in a given case master object 16.

Accordingly, there are at least two different ways that problems are described in this structure:

1. The symptom field of the symptom object 17 defines problem as reported by the user. This field simply describes the problem as the user sees it before doing any diagnosis or collecting any supporting information, and does not contain any information collected during the diagnosis.

2. The problem field of the case master object 16 contains the problem as understood at the completion of diagnosis. If a software diagnostics engine wants to match the user's reported problem against all symptoms, it searches through the symptom objects 17 and attempts to match the user reported problem against the symptoms contained in at least one symptom object 17. Once a match is successfully made, the diagnostics engine follows the node link from the matching system object 17 to the node object 12 pointed to by that symptom object 17 to see if that node object 12 describes a question or a solution. If its a solution, diagnosis is complete and the solution is displayed. If it is a question, diagnosis must continue and the question is displayed. If, on the other hand, a diagnostics engine wants to match the user's reported problems against the problem as understood at the completion of the diagnosis it instead searches through the problem fields of the case master object 16.

The case detail object 18 describes how to confirm a case. There are one or more case detail objects 18 for each case master object 16 and only case master objects 16 point to them. The case detail objects 18 consist of a set of question-and-response pairs, with following real number types within each pair:

1. Real number (question weight) identifies the importance of the question within the case;

2. Real number (response match weight) is a positive real number between 0 and 1 where 1 confirms the case; and 3. Real number (response mismatch weight) is a negative real number between 0 and −1 where −1 disconfirms the case.

While not shown in FIG. 1, hypermedia objects can be used to define all text, graphic and multimedia objects that are displayed as supporting information. Hypermedia objects are pointed to by imbedded hyperlinks in strings containing the hypermedia objects. The hypermedia content can be accessed in various formats such as OS 2, Windows, and the like.

Figure 2:
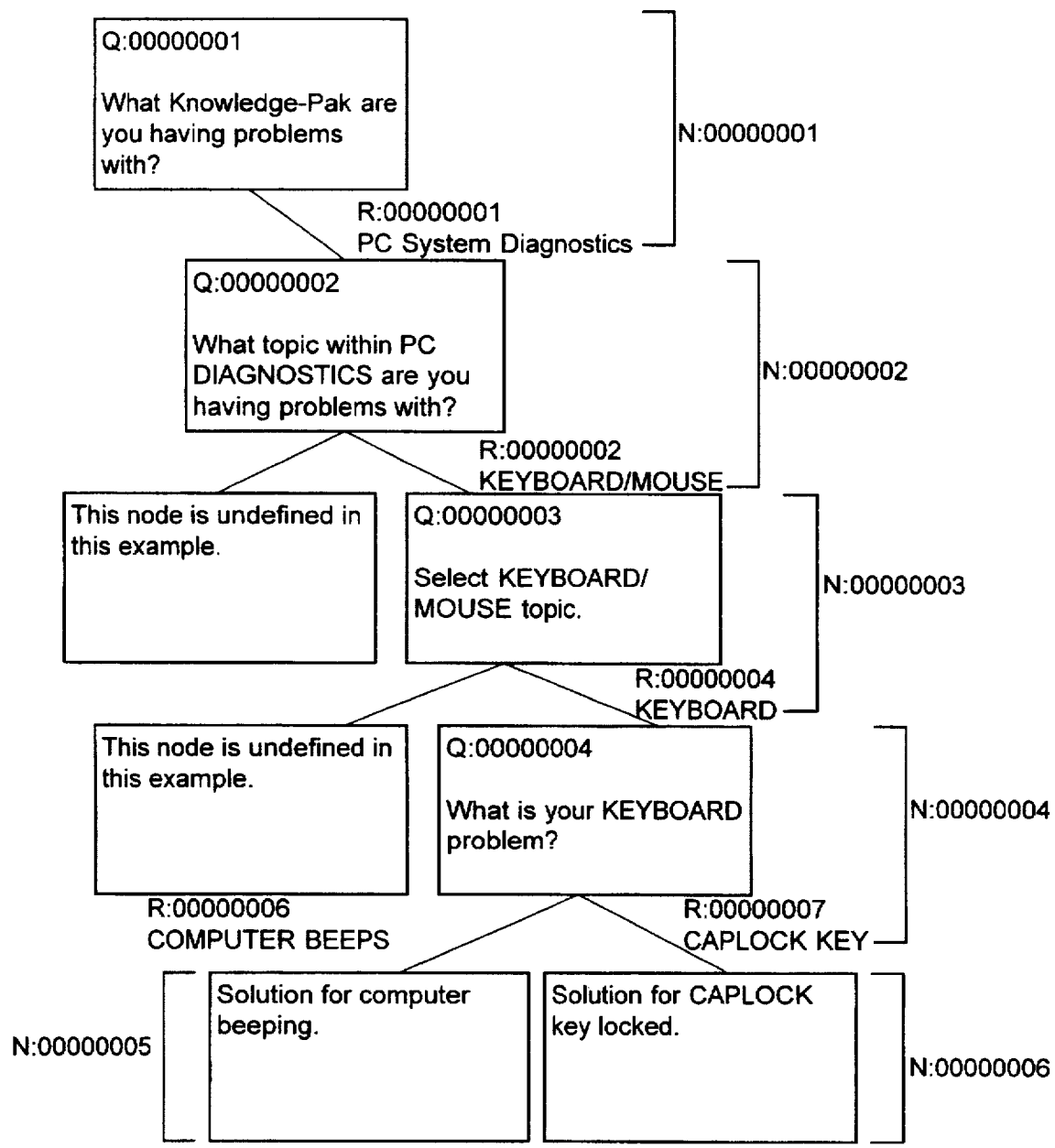
FIG. 2 is an illustration of a tree diagram of a file structure according to the present invention.

With reference to FIG. 2, a specific example showing a tree diagram of a file according to the present invention. The illustration shown in the example of FIG. 2 is a personal computer system diagnosis to provide a complete illustration of the structure.

While presently preferred embodiments of the invention have been shown and described in particularity, the invention may be otherwise embodied with the scope of the appended claims.

What is claimed is:

1. An object-oriented data structure stored on a computer-readable storage medium for operable interface with either of a case based reasoning system software engine and a tree-based expert system software engine, the data structure defining a knowledge base including a problem, a symptom of the problem, a solution to a problem, and a case in which the solution is the solution to the problem, said data structure comprising:

a first question object defining a first question;

a first response object defining a first answer;

a question node object;

a solution node object defining the case;

a case master object defining the problem, the solution, and the case; and a symptom object defining the symptom and pointing to said case master object and to said solution node object, said question node object pointing to said solution node object, said first question object, and said first response object and correlating said first question, said first response, and said solution node object, and said solution node object pointing to said case master object, whereby said data structure is capable of use by the case based reasoning system software engine to establish the existence of the case, and thus that the solution is the solution to the problem, by identifying the symptom, matching the symptom to said symptom object, following said symptom object to said solution object, and following said solution object to said case master object, and further whereby said data structure is capable of use by the tree-based expert system software engine to establish the existence of the case by selecting said first question node object, following said first question node object to said first question object to pose said first question, matching a received answer to said first response object, following said first question node correlation of said first question, said first answer, and said solution node object to said solution node object, and following said solution node object to said case master object.

2. The data structure of claim 1:

further comprising a case detail object defining the case, pointing to said question object and to said response object, and including a correlation between said first question and said first answer indicative of the likelihood that the case exists when said first answer is matched with said first question; and wherein said case master object points to said case detail object, whereby said data structure is capable of use by the case based reasoning system software engine to confirm the existence of the case by following said case master object to said case detail object, following said case detail object to said first question object, matching a response to said first question to said first response, and evaluating said correlation in said case detail object of said first answer to said first response.

3. The data structure of claim 1 further comprising:

a second question object defining a second question;

a second response object defining a second answer;

a second question node object pointing to said second question object, said second response object, and said first question node object and correlating said second question, said second response, and said first question node object, whereby said data structure is capable of use by the tree-based expert system software engine to select said first question node object by selecting the second question node object, following said second question node object to said second question object to pose said second question, matching a received answer to said second response object, and following said second question node correlation of said second question, said second answer, and said first question node object to said first question node object.

* * * * *